US009146771B2

(12) United States Patent
He et al.

(10) Patent No.: US 9,146,771 B2
(45) Date of Patent: Sep. 29, 2015

(54) RESPONDING TO A TIMEOUT OF A MESSAGE IN A PARALLEL COMPUTER

(71) Applicant: INTERNATIONAL BUSINESS MACHINES CORPORATION, Armonk, NY (US)

(72) Inventors: Jun He, Beijing (CN); Tsai-Yang Jea, Poughkeepsie, NY (US); Gary J. Mincher, Poughkeepsie, NY (US); Hanhong Xue, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/795,451

(22) Filed: Mar. 12, 2013

(65) Prior Publication Data
US 2014/0282557 A1 Sep. 18, 2014

(51) Int. Cl.
*G06F 9/46* (2006.01)
*G06F 9/54* (2006.01)

(52) U.S. Cl.
CPC ... *G06F 9/46* (2013.01); *G06F 9/54* (2013.01)

(58) Field of Classification Search
CPC ....... G06F 9/4881; G06F 9/4843; G06F 9/52; G06F 9/54; G06F 9/46
See application file for complete search history.

(56) References Cited

U.S. PATENT DOCUMENTS

| 7,213,045 | B2 * | 5/2007 | Uzrad-Nali et al. .......... 709/200 |
| 7,685,109 | B1 * | 3/2010 | Ransil et al. ........... 707/999.003 |
| 7,801,912 | B2 * | 9/2010 | Ransil et al. .................. 707/770 |
| 7,810,093 | B2 | 10/2010 | Jones et al. |
| 7,877,436 | B2 | 1/2011 | Arimilli et al. |
| 8,214,424 | B2 | 7/2012 | Arimilli et al. |
| 8,352,798 | B2 * | 1/2013 | Buckler et al. ............... 714/38.1 |
| 8,799,522 | B2 * | 8/2014 | Elko et al. .......................... 710/5 |
| 2007/0168336 | A1 * | 7/2007 | Ransil et al. ...................... 707/3 |
| 2009/0198762 | A1 * | 8/2009 | Arimilli et al. ............... 709/201 |
| 2010/0199128 | A1 | 8/2010 | Coppinger et al. |
| 2011/0145635 | A1 * | 6/2011 | Buckler et al. .................. 714/15 |

* cited by examiner

*Primary Examiner* — Van Nguyen
(74) *Attorney, Agent, or Firm* — Edward J. Lenart; James R. Nock; Kennedy Lenart Spraggins LLP

(57) ABSTRACT

Methods, apparatuses, and computer program products for responding to a timeout of a message in a parallel computer are provided. The parallel computer includes a plurality of compute nodes operatively coupled for data communications over one or more data communications networks. Each compute node includes one or more tasks. Embodiments include a first task of a first node sending a message to a second task on a second node. Embodiments also include the first task sending to the second node a command via a parallel operating environment (POE) in response to a timeout of the message. The command instructs the second node to perform a timeout motivated operation.

9 Claims, 9 Drawing Sheets

RESPONDING TO A TIMEOUT OF A MESSAGE IN A PARALLEL COMPUTER

STATEMENT REGARDING FEDERALLY SPONSORED RESEARCH OR DEVELOPMENT

This invention was made with United States Government support under Agreement No. HR0011-07-9-0002, awarded by DARPA. The Government has certain rights in the invention.

BACKGROUND OF THE INVENTION

1. Field of the Invention

The field of the invention is data processing, or, more specifically, methods, apparatuses, and computer program products for responding to a timeout of a message in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Current parallel computers are capable of processing in parallel a number of tasks of a job that just a few years ago would have seemed unimaginable. For example, current parallel computers may execute in parallel thousands of tasks as part of a job. Tasks executing on compute nodes in the parallel computer often send each other data, in the form of messages. When one tasks notices a message did not receive an acknowledgement from a remote task within a specified period of time, execution of the job may be terminated. With so many tasks of the job executing on different compute nodes, it may be difficult to respond to a timeout failure of one task.

SUMMARY OF THE INVENTION

Methods, apparatuses, and computer program products for responding to a timeout of a message in a parallel computer are provided. The parallel computer includes a plurality of compute nodes operatively coupled for data communications over one or more data communications networks. Each compute node includes one or more tasks. Embodiments include a first task of a first node sending a message to a second task on a second node. Embodiments also include the first task sending to the second node a command via a parallel operating environment (POE) in response to a timeout of the message. The command instructs the second node to perform a timeout motivated operation.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
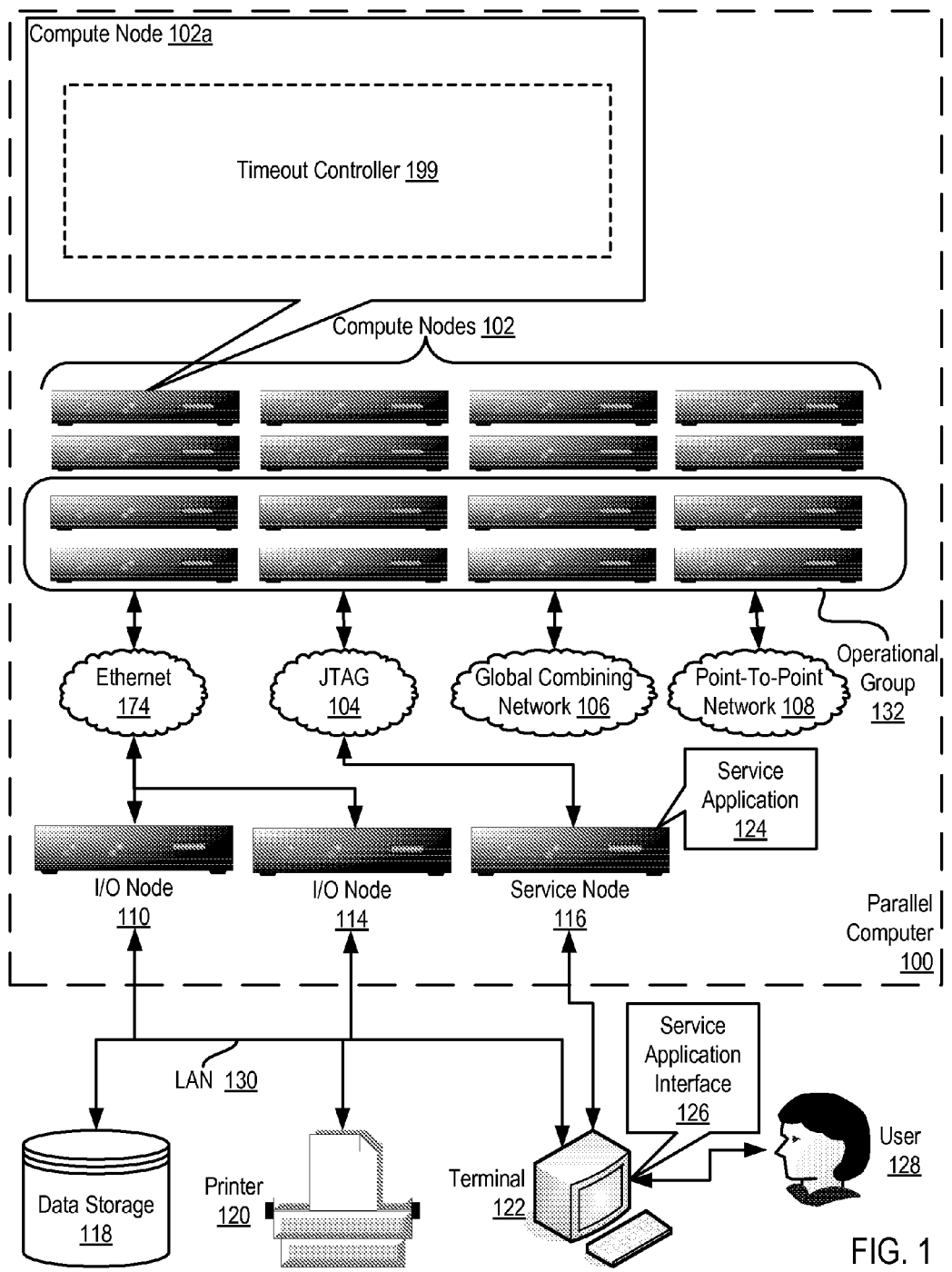
FIG. 1 illustrates an example system for responding to a timeout of a message in a parallel computer according to embodiments of the present invention.

Example methods, apparatus, and products for responding to a timeout of a message in a parallel computer in accordance with the present invention are described with reference to the accompanying drawings, beginning with FIG. 1. FIG. 1 illustrates an example system for responding to a timeout of a message in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the receive buffer of a root process. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (100). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for responding to a timeout of a message, the parallel computer including a plurality of compute nodes (100). Such a parallel computer (100) is typically composed of many compute nodes, but for ease of explanation one of the compute nodes (102a) in this example are referenced in particular. The compute node (102a) includes a timeout controller (199) for responding to a timeout of a message in a parallel computer. The timeout controller (199) of FIG. 1 may be embodied as a module of computer program instructions executing on computer hardware. Specifically, the timeout controller (199) of FIG. 1 can implement responding to a timeout of a message in a parallel computer (100) by: sending, by a first task of a first node, a message to a second task on a second node. In response to a timeout of the message, the first task sends to the second node a command via a parallel operating environment (POE). A POE operates as a global job organizer for all of the compute nodes. The command instructs the second node to perform a timeout motivated operation. A timeout motivated operation may be performed by a partition manager daemon (PMD) on the second node or a task of the second node. Non-limiting examples of timeout motivated operations include commands such as log vmstat; ps info; coredump; system health check; responding to ip pings, and others as will occur to those of skill in the art. The timeout motivated operation may be useful to correct, diagnose, or debug the timeout occurrence. That is, according to embodiments of the present invention, a timeout of a message results in other operations occurring, which may be used to improve the efficiency and operation of the parallel computer.

The arrangement of nodes, networks, and I/O devices making up the example apparatus illustrated in FIG. 1 are for explanation only, not for limitation of the present invention. Systems configured for responding to a timeout of a message in a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102). Parallel computers (102) configured for responding to a timeout of a message according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Responding to a timeout of a message in a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in responding to a timeout of a message in a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node.

Figure 2:
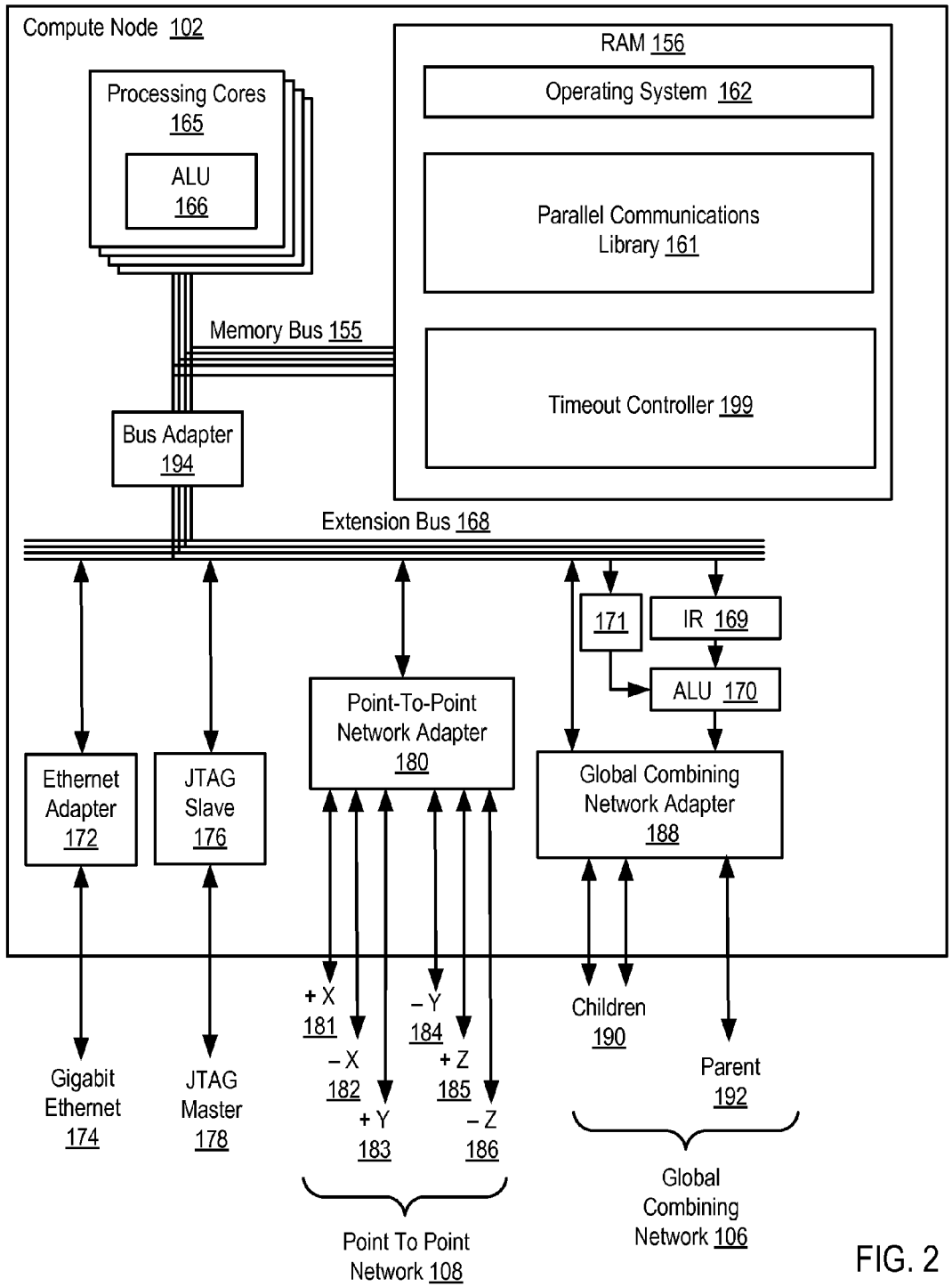
FIG. 2 sets forth a block diagram of an example compute node useful in responding to a timeout of a message in a parallel computer according to embodiments of the present invention.

In the example of FIG. 2, each processing core (165) supports the execution of one or more communicators. Each communicator represents a set of computer program instructions executing on the processing core (165). The set of computer program instructions executing on the processing core (165) may include computer program instructions for sending messages between each communicator executing on a particular processing core (165), computer program instructions for sending messages between communicators on different processing cores, computer program instructions for sending messages between communicators executing on distinct compute nodes, computer program instructions for performing collective operations, and so on.

Stored in RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the MPI library and the 'Parallel Virtual Machine' ('PVM') library.

Also stored in RAM (156) is an operating system (162), a module of computer program instructions and routines for an application program's access to other resources of the compute node. It is typical for the parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Also stored in RAM (156) is a timeout controller (199) for use in responding to a timeout of a message in a parallel computer (100). The timeout controller (199) of FIG. 2 includes computer program instructions that, when executed, can be used for responding to a timeout of a message in a parallel computer (100). Specifically, the timeout controller (199) of FIG. 1 can implement responding to a timeout of a message in a parallel computer (100) by: sending, by a first task of a first node, a message to a second task on a second node. In response to a timeout of the message, the first task sends to the second node a command via a parallel operating environment (POE). by: a first task of a first node sending a message to a second task on a second node; and sending to the second node a command via a parallel operating environment (POE) in response to a timeout of the message. The command instructs the second node to perform a timeout motivated operation.

In the example of FIG. 2, responding to a timeout of a message in a parallel computer (100) may further be carried out by determining, by a communicator attempting to send data to the destination, whether the communicator has enough available data communications tokens to send the data to the destination. Responding to a timeout of a message in a parallel computer (100) may further be carried out by sending, by the communicator, the data to the destination.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for responding to a timeout of a message in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for responding to a timeout of a message in a parallel computer according to embodiments of the present invention.

The data communications adapters in the example of FIG. 2 include a Point-To-Point Network Adapter (180) that couples example compute node (102) for data communications to a network (108) for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
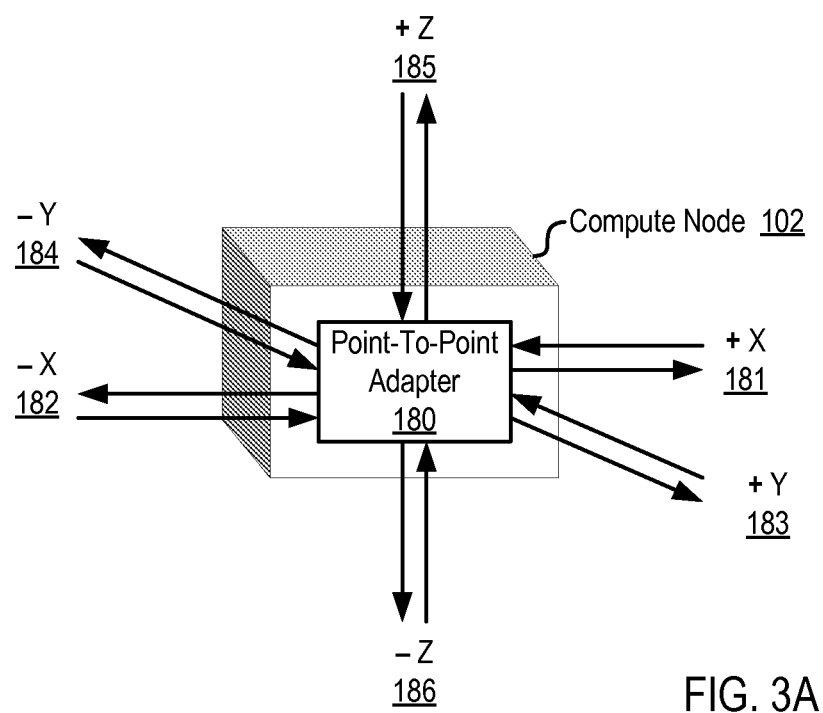
FIG. 3A sets forth a block diagram of an example Point-To-Point Adapter useful in systems for responding to a timeout of a message in a parallel computer according to embodiments of the present invention.

For further explanation, FIG. 3A sets forth a block diagram of an example Point-To-Point Adapter (180) useful in systems for responding to a timeout of a message in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
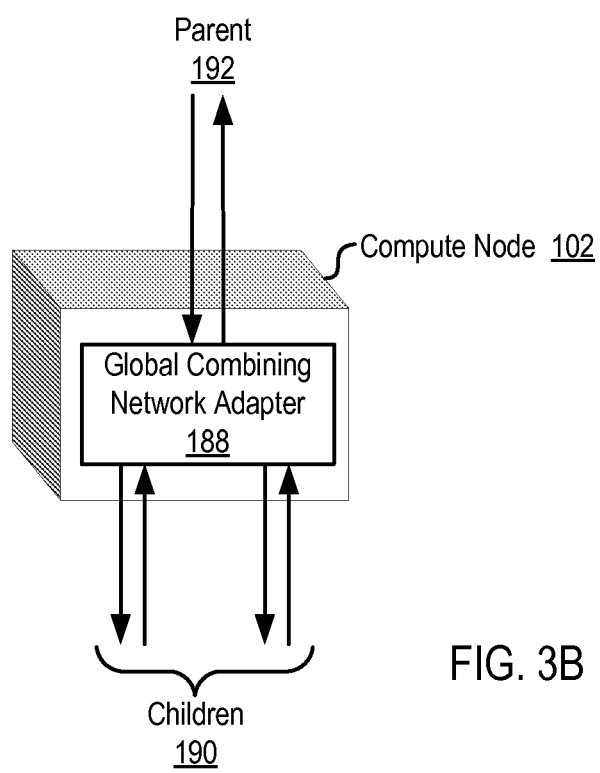
FIG. 3B sets forth a block diagram of an example Global Combining Network Adapter useful in systems for responding to a timeout of a message in a parallel computer according to embodiments of the present invention.

For further explanation, FIG. 3B sets forth a block diagram of an example Global Combining Network Adapter (188) useful in systems for responding to a timeout of a message in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
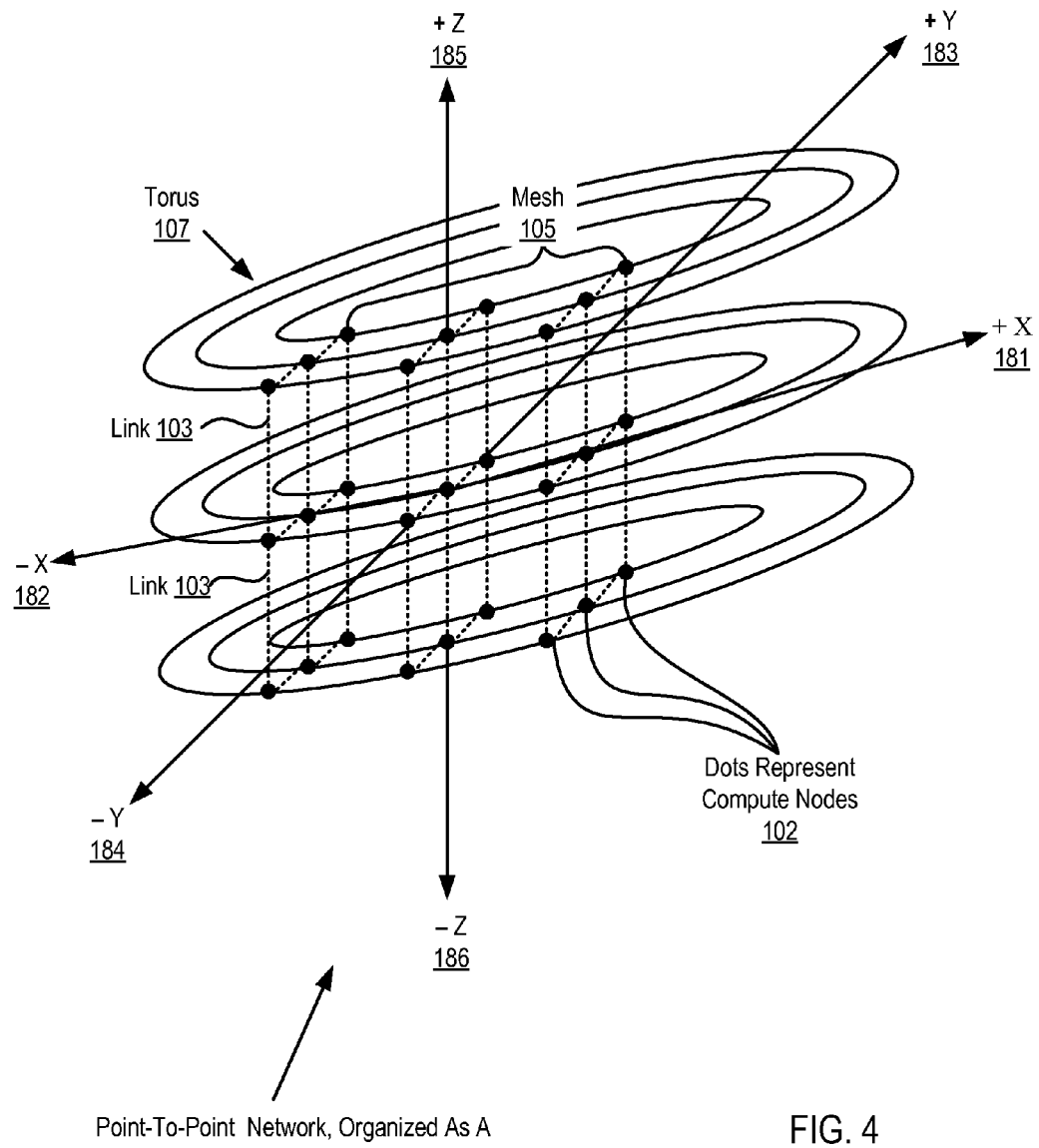
FIG. 4 sets forth a line drawing illustrating an example data communications network optimized for point-to-point operations useful in systems capable of responding to a timeout of a message in a parallel computer according to embodiments of the present invention.

For further explanation, FIG. 4 sets forth a line drawing illustrating an example data communications network (108) optimized for point-to-point operations useful in systems capable of responding to a timeout of a message in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in responding to a timeout of a message in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in responding to a timeout of a message in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
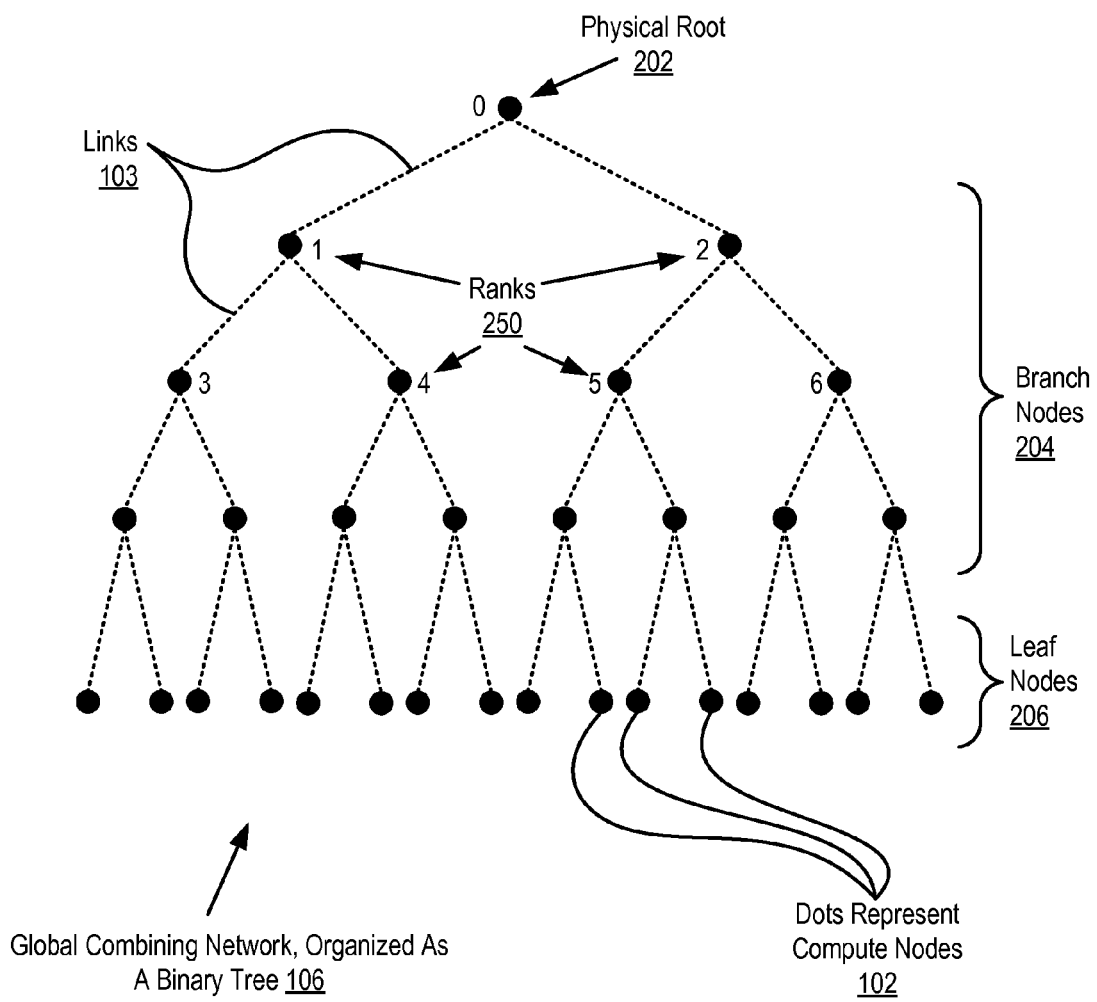
FIG. 5 sets forth a line drawing illustrating an example global combining network useful in systems capable of responding to a timeout of a message in a parallel computer according to embodiments of the present invention.

For further explanation, FIG. 5 sets forth a line drawing illustrating an example global combining network (106) useful in systems capable of responding to a timeout of a message in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in responding to a timeout of a message in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
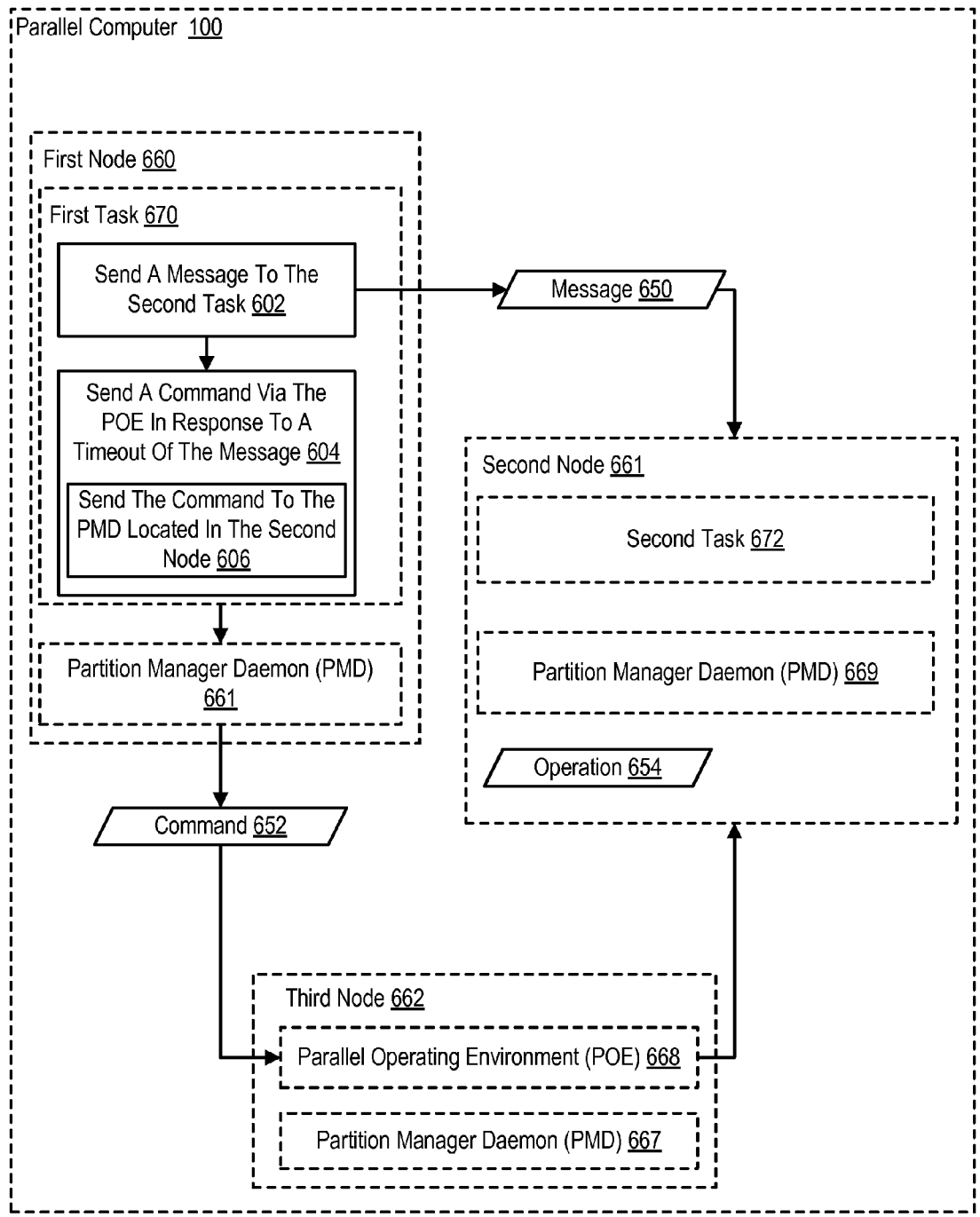
FIG. 6 sets forth a flow chart illustrating an example method for responding to a timeout of a message in a parallel computer according to embodiments of the present invention.

For further explanation, FIG. 6 sets forth a flow chart illustrating an example method for responding to a timeout of a message in a parallel computer (100) according to embodiments of the present invention. The parallel computer (100) of FIG. 6 is similar to the parallel computer described above with reference to FIGS. 1-5, as the parallel computer (100) includes a plurality of compute nodes (102 of FIG. 1) operatively coupled for data communications over one or more data communications networks (104, 106, 108, and 174 of FIG. 1). Each compute node (102 of FIG. 1) includes one or more computer processors and tasks. In the example of FIG. 6, a first node (660), a second node (661), and a third node (662) are illustrated by readers of skill in the art will realize that any number of nodes may be useful for responding to a timeout of a message according to embodiments of the present invention.

In the example of FIG. 6, the first node (660) includes a first task (670) and a partition manager daemon (PMD) (661). The second node (661) includes a PMD (669) and a second task (672). The third node (662) includes a PMD (667) and a POE (668). A POE operates as a global job organizer for all of the compute nodes. The command instructs the second node to perform a timeout motivated operation. A timeout motivated operation may be performed by a partition manager daemon (PMD) on the second node or a task of the second node. The POE connects the compute nodes via sockets to the PMDs. The POE may also be responsible for spawning PMDs. In a particular embodiment, a POE is designed to launch only one PMD per node per job. Each PMD on each node may be configured to distribute child processes to execute user specified parallel program tasks. Tasks can communicate with PMDs via 'pipes.'

The method of FIG. 6 includes a first task (670) of a first node (660) sending (602) a message (650) to a second task (672) on a second node (661). Sending (602) a message (650) to a second task (672) on a second node (661) may be carried out by transmitting the message via one or more data communications networks.

The method of FIG. 6 also includes the first task (670) sending (604) to the second node (661) a command (652) via a parallel operating environment (POE) (668) in response to a timeout of the message (652). The command (652) instructs the second node (661) to perform a timeout motivated operation (654). Non-limiting examples of timeout motivated operations include commands such as log vmstat; ps info; coredump; system health check; responding to ip pings, and others as will occur to those of skill in the art. The timeout motivated operation may be useful to correct, diagnose, or debug the timeout occurrence. Sending (604) to the second node (661) a command (652) via a parallel operating environment (POE) (668) in response to a timeout of the message (652) may be carried out by transmitting a command in a piped connection between the first task and the PMD of the first node; transmitting the message in a socket between the PMD of the first node and the POE; transmitting the message in another socket between the POE and the second node.

In the example method of FIG. 6, sending (604) to the second node (661) a command (652) via a parallel operating environment (POE) (668) in response to a timeout of the message (652) includes sending (606) the command (652) to a partition manager daemon (PMD) (669) located in the second node (661). Sending (606) the command (652) to a partition manager daemon (PMD) (669) located in the second node (661) may be carried out by transmitting a command in a piped connection between the first task and the PMD of the first node; transmitting the message in a socket between the PMD of the first node and the POE; transmitting the message in another socket between the POE and the PMD of the second node.

Figure 7:
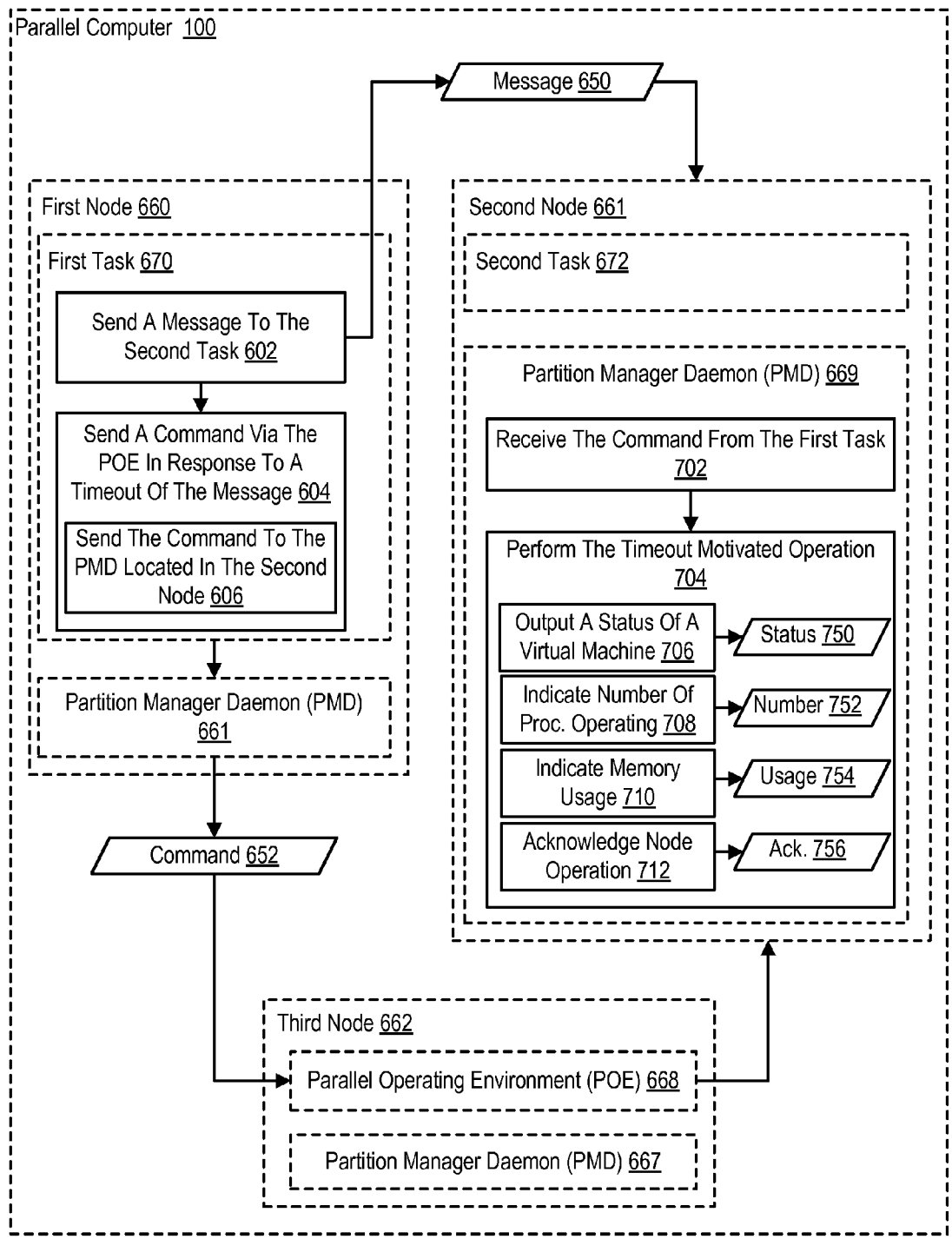
FIG. 7 sets forth a flow chart illustrating an additional example method for responding to a timeout of a message in a parallel computer according to embodiments of the present invention.

For further explanation, FIG. 7 sets forth a flow chart illustrating an additional example method for responding to a timeout of a message in a parallel computer (100) according to embodiments of the present invention. The method of FIG. 7 is similar to the method of FIG. 6 in that the method of FIG. 7 also includes sending (604) to the second node (661) a command (652) via a parallel operating environment (POE) (668) in response to a timeout of the message (652); sending (604) to the second node (661) a command (652) via a parallel operating environment (POE) (668) in response to a timeout of the message (652); and sending (606) the command (652) to a partition manager daemon (PMD) (669) located in the second node (661).

The method of FIG. 7 also includes the PMD (669) on the second node (661) receiving (702) the command from the first task (702). Receiving (702) the command from the first task (702) may be carried out by receiving the message via a piped connection between the first task and the PMD of the first node, a socket between the PMD of the first node and the POE, another socket between the POE and the PMD of the second node.

The method of FIG. 7 also includes the PMD (669) performing (704) the timeout motivated operation (654) in response to receiving the command (652). Performing (704) the timeout motivated operation (654) in response to receiving the command (652) may be carried out by performing one or more operations for gathering, generating, and transmitting information for diagnosing, debugging, or correcting the timeout occurrence.

In the example method of FIG. 7, performing (704) the timeout motivated operation (654) includes at least one of outputting (706) a status (750) of a virtual machine; indicating (708) a number (752) of processors operating; indicating (710) memory usage (754); and acknowledging (712) node operation. Outputting (706) a status (750) of a virtual machine may be carried out by executing a log vmstat command; and gathering a status of a virtual machine. Indicating (708) a number (752) of processors operating may be carried out by executing a ps info command; and identifying the number of processors executing on the node. Indicating (710) memory usage (754) may be carried out by gathering memory usage information and storing the information as memory usage (754). Acknowledging (712) node operation may be carried out by responding to an ip ping and generating an acknowledgement (756).

Figure 8:
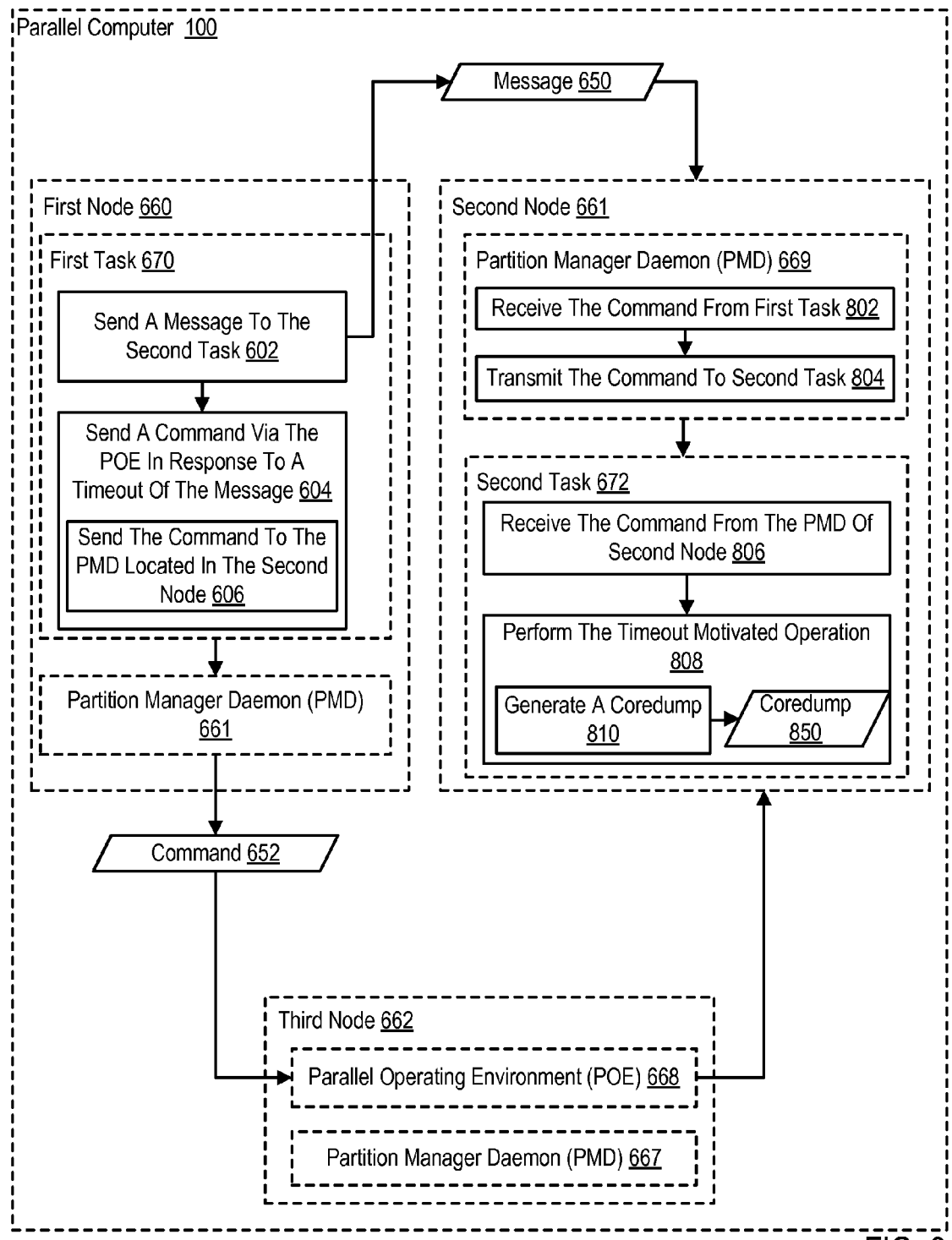
FIG. 8 sets forth a flow chart illustrating an additional example method for responding to a timeout of a message in a parallel computer according to embodiments of the present invention.

For further explanation, FIG. 8 sets forth a flow chart illustrating an additional example method for responding to a timeout of a message in a parallel computer (100) according to embodiments of the present invention. The method of FIG. 8 is similar to the method of FIG. 6 in that the method of FIG. 8 also includes sending (604) to the second node (661) a command (652) via a parallel operating environment (POE) (668) in response to a timeout of the message (652); sending (604) to the second node (661) a command (652) via a parallel operating environment (POE) (668) in response to a timeout of the message (652); and sending (606) the command (652) to a partition manager daemon (PMD) (669) located in the second node (661).

The method of FIG. 8 includes the PMD (669) on the second node (661) receiving (802) from the first task (670) the command (652). Receiving (802) from the first task (670) the command (652) may be carried out by receiving the message via a piped connection between the first task and the PMD of the first node, a socket between the PMD of the first node and the POE, another socket between the POE and the PMD of the second node.

The method of FIG. 8 also includes the PMD (669) transmitting (804) the command (652) to the second task (672) in response to receiving the command (652). Transmitting (804) the command (652) to the second task (672) in response to receiving the command (652) may be carried out by transmitting the message via a piped connection between the PMD of the second node and the second task.

The method of FIG. 8 also includes the second task (672) receiving (806) the command (652) from the PMD (669). Receiving (806) the command (652) from the PMD (669) may be carried out by receiving the message via a piped connection between the PMD of the second node and the second task of the second node.

The method of FIG. 8 also includes the second task (672) performing (808) the timeout motivated operation (654) in response to receiving the command (652). Performing (808) the timeout motivated operation (654) in response to receiving the command (652) may be carried out by generating information indicative of the status of the task.

In the example method of FIG. 8, performing (808) the timeout motivated operation (654) in response to receiving the command (652) includes generating (810) a coredump (850). Typically a coredump consists of a record of the state of the working memory of the processor and at a specific period of time. Generating (810) a coredump (850) may be carried out by performing a coredump operation; and generating a core file.

Example embodiments of the present invention are described largely in the context of a fully functional computer system for responding to a timeout of a message in a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for responding to a timeout of a message in a parallel computer, the parallel computer including a plurality of compute nodes operatively coupled for data communications over one or more data communications networks, each compute node including one or more tasks, the apparatus comprising a computer memory operatively coupled to the one or more computer processors, the computer memory having disposed within it computer program instructions that, when executed by the one or more computer processors, cause the apparatus to carry out the steps of:

sending, by a first task of a first node, a message to a second task on a second node;

in response to a timeout of the message, sending to a partition manager daemon (PMD) located in to the second node, by the first task, a command via a parallel operating environment (POE) located on a third node, the command instructing the second node to perform a timeout motivated operation;

receiving from the first task, by the PMD on the second node, the command; and in response to receiving the command, performing, by the PMD, the timeout motivated operation, whereby the timeout motivated operation is used to diagnose the timeout occurrence.

2. The apparatus of claim 1 wherein performing, by the PMD, the timeout motivated operation includes at least one of outputting a status of a virtual machine; indicating a number of processors operating; indicating memory usage; and acknowledging node operation.

3. The apparatus of claim 1 further comprising computer program instructions that, when executed by the one or more computer processors, cause the apparatus to carry out the steps of:

receiving from the first task, by the PMD on the second node, the command;

in response to receiving the command, transmitting, by the PMD, the command to the second task;

receiving, by the second task, the command from the PMD; and in response to receiving the command, performing, by the second task, the timeout motivated operation.

4. The apparatus of claim 3 wherein performing, by the PMD, the timeout motivated operation includes generating a coredump.

5. A computer program product for responding to a timeout of a message in a parallel computer, the parallel computer including a plurality of compute nodes operatively coupled for data communications over one or more data communications networks, each compute node including one or more tasks, the computer program product disposed upon a non-transitory computer readable medium, the computer program product comprising computer program instructions that, when executed, cause a computer to carry out the steps of:

sending, by a first task of a first node, a message to a second task on a second node;

in response to a timeout of the message, sending to a partition manager daemon (PMD) located in to the second node, by the first task, a command via a parallel operating environment (POE) located on a third node, the command instructing the second node to perform a timeout motivated operation;

receiving from the first task, by the PMD on the second node, the command; and in response to receiving the command, performing, by the PMD, the timeout motivated operation, whereby the timeout motivated operation is used to diagnose the timeout occurrence.

6. The computer program product of claim 5 wherein performing, by the PMD, the timeout motivated operation includes at least one of outputting a status of a virtual machine; indicating a number of processors operating; indicating memory usage; and acknowledging node operation.

7. The computer program product of claim 5 further comprising computer program instructions that, when executed, cause a computer to carry out the steps of:

receiving from the first task, by the PMD on the second node, the command;

in response to receiving the command, transmitting, by the PMD, the command to the second task;

receiving, by the second task, the command from the PMD; and in response to receiving the command, performing, by the second task, the timeout motivated operation.

8. The computer program product of claim 7 wherein performing, by the PMD, the timeout motivated operation includes generating a coredump.

9. The computer program product of claim 5 wherein the computer readable medium comprises a storage medium.

* * * * *